US012587539B2

(12) United States Patent
Iqbal

(10) Patent No.: US 12,587,539 B2
(45) Date of Patent: Mar. 24, 2026

(54) LAYING OUT SECURITY ZONE POLICIES FOR INFORMATION TECHNOLOGY AND OPERATIONAL TECHNOLOGY DEVICES ON HYBRID NETWORKS

(71) Applicant: Fortinet, Inc., Sunnyvale, CA (US)

(72) Inventor: Aasef Iqbal, Dubai (IN)

(73) Assignee: Fortinet, Inc., Sunnyvale, CA (US)

( * ) Notice: Subject to any disclaimer, the term of this patent is extended or adjusted under 35 U.S.C. 154(b) by 515 days.

(21) Appl. No.: 18/129,487

(22) Filed: Mar. 31, 2023

(65) Prior Publication Data

US 2024/0333721 A1     Oct. 3, 2024

(51) Int. Cl.
H04L 9/40          (2022.01)

(52) U.S. Cl.
CPC ........ H04L 63/105 (2013.01); H04L 63/1425 (2013.01); H04L 63/20 (2013.01)

(58) Field of Classification Search
None
See application file for complete search history.

(56) References Cited

U.S. PATENT DOCUMENTS

| | | | | |
|---|---|---|---|---|
| 11,979,419 B2 * | 5/2024 | Wen | ................... | H04L 63/1416 |
| 12,432,218 B1 * | 9/2025 | Arutyunov | .......... | H04L 63/0838 |

| | | | | |
|---|---|---|---|---|
| 2014/0137257 A1 * | 5/2014 | Martinez | ............. | H04L 63/1433 726/25 |
| 2015/0281287 A1 * | 10/2015 | Gill | ..................... | H04L 63/1416 726/1 |
| 2016/0087958 A1 * | 3/2016 | Luo | ..................... | H04L 63/0209 713/168 |
| 2021/0037025 A1 * | 2/2021 | Schlarman | .......... | H04L 63/1408 |
| 2021/0194851 A1 * | 6/2021 | Barton | ................... | H04L 63/20 |
| 2021/0406720 A1 * | 12/2021 | Song | .................. | H04L 63/0227 |
| 2024/0155474 A1 * | 5/2024 | Andreasen | ............ | H04W 48/18 |
| 2024/0323199 A1 * | 9/2024 | Bassi | ................. | H04L 63/1425 |

* cited by examiner

*Primary Examiner* — Joseph P Hirl
*Assistant Examiner* — Hassan Saadoun
(74) *Attorney, Agent, or Firm* — Law Office of Dorian Cartwright; Dorian Cartwright

(57) ABSTRACT

From deep packet inspection, it is determined whether each of the plurality of network devices is part of the IT segment or the OT segment by examining a physical network address, a data type and a network protocol of one or more of the network packets. A network hierarchy is dynamically generated that maps the IT segment with interconnected IT levels having IT devices relative to the OT segment with interconnected OT levels having OT devices. A plurality of security zones is set up from the IT layout and the OT layout. Each of the plurality of security zones has a corresponding one or more security zone policies. The network hierarchy is output and overlaid with the plurality of security zones for display to a user.

16 Claims, 5 Drawing Sheets

310

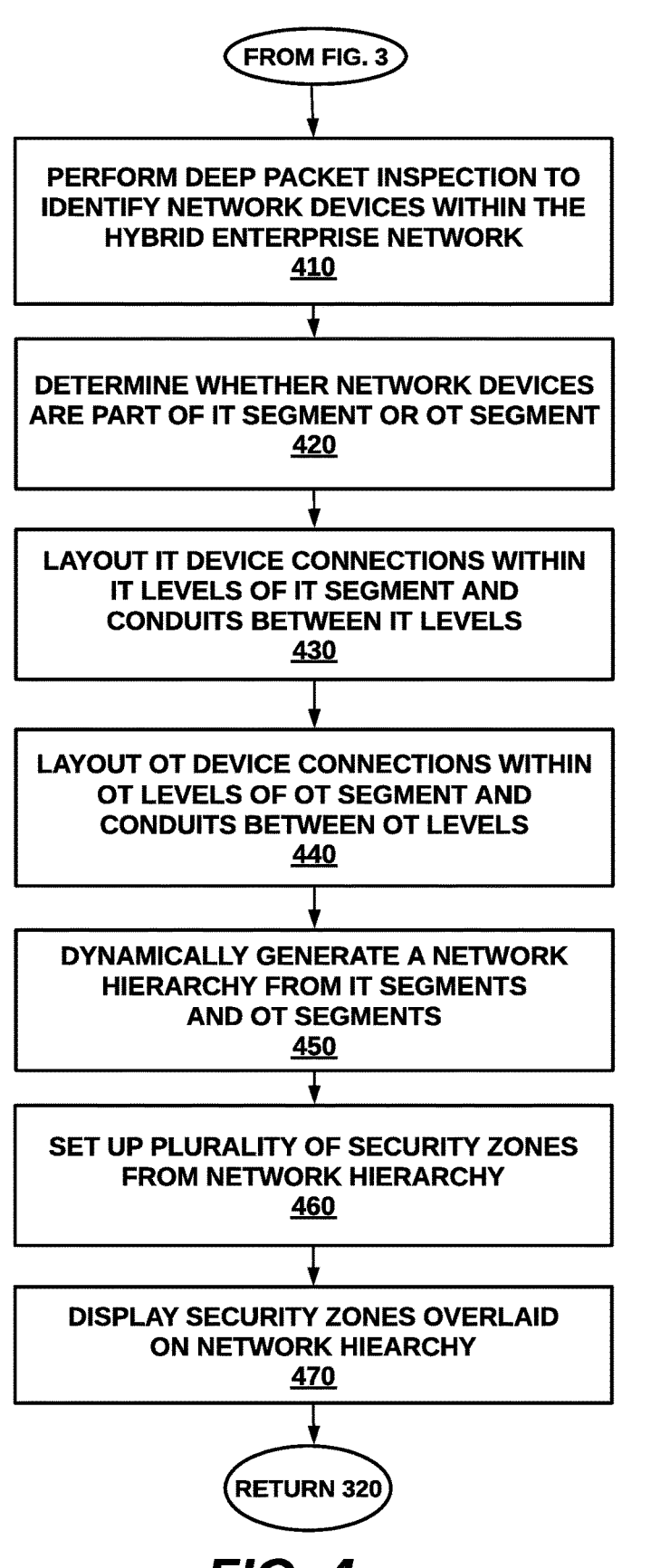

FROM FIG. 3

PERFORM DEEP PACKET INSPECTION TO
IDENTIFY NETWORK DEVICES WITHIN THE
HYBRID ENTERPRISE NETWORK
410

DETERMINE WHETHER NETWORK DEVICES
ARE PART OF IT SEGMENT OR OT SEGMENT
420

LAYOUT IT DEVICE CONNECTIONS WITHIN
IT LEVELS OF IT SEGMENT AND
CONDUITS BETWEEN IT LEVELS
430

LAYOUT OT DEVICE CONNECTIONS WITHIN
OT LEVELS OF OT SEGMENT AND
CONDUITS BETWEEN OT LEVELS
440

DYNAMICALLY GENERATE A NETWORK
HIERARCHY FROM IT SEGMENTS
AND OT SEGMENTS
450

SET UP PLURALITY OF SECURITY ZONES
FROM NETWORK HIERARCHY
460

DISPLAY SECURITY ZONES OVERLAID
ON NETWORK HIEARCHY
470

RETURN 320

*FIG. 4*

LAYING OUT SECURITY ZONE POLICIES FOR INFORMATION TECHNOLOGY AND OPERATIONAL TECHNOLOGY DEVICES ON HYBRID NETWORKS

FIELD OF THE INVENTION

The invention relates generally to computer networks, and more specifically, for automatically laying out security zone policies for information technology (IT) and operational technology (OT) devices in a hybrid enterprise network including an IT segment and an OT segment.

BACKGROUND

Like enterprise computer networks and infrastructure, Industrial Control Systems and Operational Technology networks and infrastructure follow a specific architecture deployment model known as, Purdue Enterprise Reference Architecture (PERA) or Purdue Model in short. First conceived in the early 1990s, the original Purdue Model forms the basis of ICS from network design and deployment perspective, such as network connectivity between the controllers, systems, network devices, and external networks.

This model describes a hierarchical set of Levels for applications and controls. Levels 0, 1, and 2 (the process control zone) define physical processes, sensors, actuators, and related instrumentation as well as the systems that supervise these implementations. Level 3 (the operations and control zone) describes overall operations of the industrial control system (ICS) across multiple processes. Together, these Levels comprise an OT environment. Levels 4 and 5 are collectively known as the business zone, comprised of enterprise IT systems and applications.

To address the security challenges within ICS/OT networks, the automation industry introduced the concept of "zones" and "conduits" to segment the ICS network into multiple zones, isolating the various components in an ICS. In the context of technological implementation, it is commonly referred as network segmentation and micro-segmentation. The zone and conduit model is documented in the standard International Society of Automation (ISA)/International Electrotechnical Commission (IEC) 62443-1-1 and IEC 62443-3-2 and provides detailed guidance on how to define zones and conduits.

Within an ICS, a zone groups logical or physical assets that share common security requirements and defines the security boundaries for information entering and leaving a zone. Conduits are introduced between different zones (typically represented in the form 1.5, 2.5, 3.5 and likewise) to control communication between zones and to implement security controls. Conduits act as control mechanisms (gatekeepers) between the different zone boundaries.

Following a thorough risk assessment of the ICS, the assets must be grouped (or "zoned" in Purdue Model terminology) and segmented from other assets. Special segments (zones) known as "conduits" need to be implemented between the zones and network boundaries or where the zones converge. This allows implementation of various security controls including, monitoring and filtering of network communication or information exchange. The advantages of such segmentation are in improving security enforcement and control as well as improving network visibility.

It involves a complex interaction of OT devices, with flows of information moving along conduits between zones of the Purdue Model.

What is needed is a robust technique for automatically laying out security zone policies for IT and OT devices in a hybrid enterprise network including an IT segment and an OT segment.

SUMMARY

To meet the above-described needs, methods, computer program products, and systems for automatically laying out security zone policies for IT and OT devices in a hybrid enterprise network including an IT segment and an OT segment.

In one embodiment, deep packet inspection is performed on network packets to identify a plurality of network devices within the hybrid enterprise network. It is determined whether each of the plurality of network devices is part of the IT segment or the OT segment by examining a physical network address, a data type and a network protocol of one or more of the network packets. The IT segment has multiple levels and the OT segment has multiple levels. IT devices can be laid out within the IT levels of the IT segment, and identifying each IT device connection to a conduit between the IT levels, based on the examination of network packets. Additionally, OT devices can be laid out within the OT levels of the OT segment, and identifying each OT device connection to a conduit between the OT levels, based on the examination of network packets.

In another embodiment, a network hierarchy is dynamically generated that maps the IT segment with interconnected IT levels having IT devices relative to the OT segment with interconnected OT levels having OT devices. A plurality of security zones is set up from the IT layout and the OT layout. Each of the plurality of security zones has a corresponding one or more security zone policies. The network hierarchy is output and overlaid with the plurality of security zones for display to a user.

Advantageously, network performance and computer performance are improved with more stringent security standards.

BRIEF DESCRIPTION OF THE DRAWINGS

In the following drawings, like reference numbers are used to refer to like elements. Although the following figures depict various examples of the invention, the invention is not limited to the examples depicted in the figures.

FIG. 4 is a more detailed flow diagram illustrating a step for automatically laying out hybrid OT and IT network into security zones, from the method of FIG. 4, according to an embodiment.

DETAILED DESCRIPTION

Methods, computer program products, and systems for automatically laying out security zone policies for IT and OT devices in a hybrid enterprise network including an IT segment and an OT segment. One of ordinary skill in the art will recognize many alternative embodiments that are not explicitly listed based on the following disclosure.

I. Systems for OT/IT Security Zone Layout (FIGS. 1-2)

Figure 1:
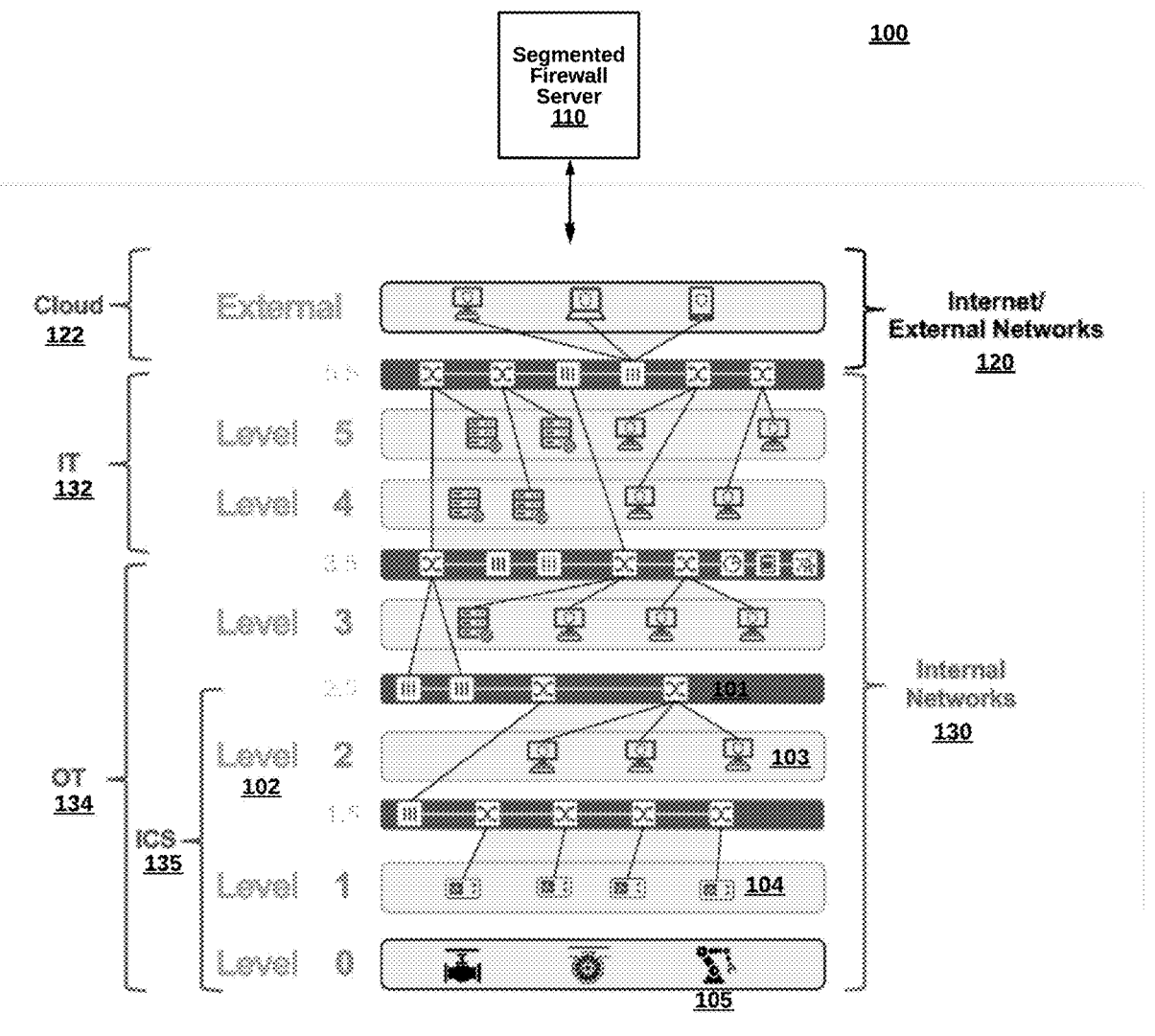
FIG. 1 is a high-level block diagram illustrating a system for automatically laying out security zone policies for IT and OT devices in a hybrid enterprise network including an IT segment and an OT segment, according to one embodiment.
Figure 2:
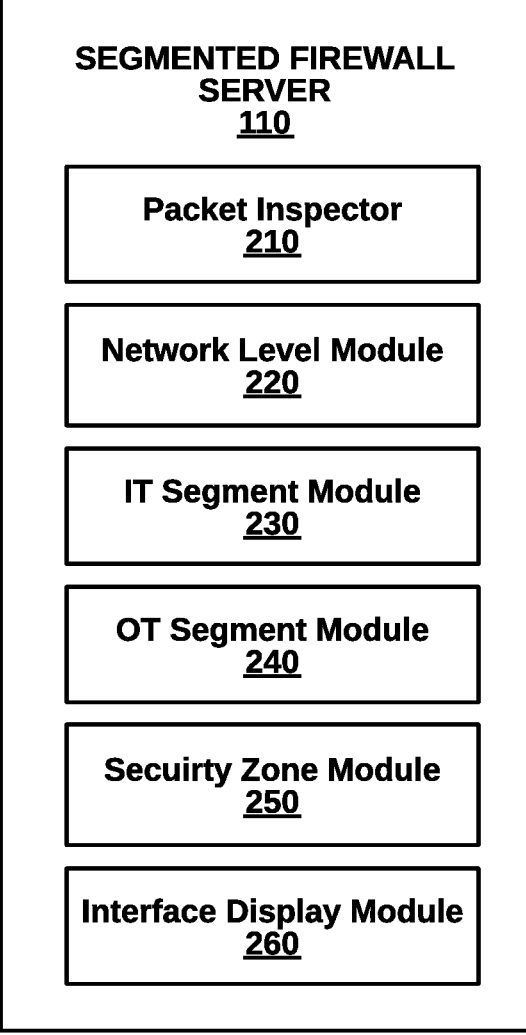
FIG. 2 is a more detailed block diagram illustrating a segmented firewall server of the system of FIG. 1, according to one embodiment.

FIG. 1 is a high-level block diagram illustrating a system 100 for automatically laying out security zone policies for IT and OT devices in a hybrid enterprise network including an IT segment and an OT segment, according to one embodiment. The system 100 includes a segmented firewall devices server 110 coupled to external networks 120 and internal networks 130. The external network 120 can include, for example, the Internet or other network aspects outside of the firewall, such as a private cloud 122. The internal networks 130 include an IT 132 and an OT 134. In turn, the OT 134 includes an ICS 135. Other embodiments of the system 100 can include additional components that are not shown in FIG. 1, such as controllers, network gateways, access points, and additional firewalls, stations, and other network devices.

In one embodiment, the components of the system 100 are coupled in communication over a private network connected to a public network, such as the Internet. In another embodiment, system 100 is an isolated, private network. The components can be connected to the data communication system via hard wire (e.g., segmented firewall server 110). The components can also be connected via wireless networking (e.g., station 120). The data communication network can be composed of any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802, 11r, 802.11be, Wi-Fi 6, Wi-Fi 6E, Wi-Fi 7 and the like. Components can use IPV4 or IPV6 address spaces.

The segmented firewall server 110 applies network polices based on different security zones. To do so, a view of devices and interconnections is generated as a network hierarchy. Devices are grouped into different security zones for disparate treatment. For example, OT devices are of a different nature than IT devices, necessitating different rules for network behavior and protection. Optionally, cloud devices are added to a security zone with a set of custom policies. 110 The segmented firewall server 110 is further detailed below in accordance with FIG. 2.

In one embodiment, zones are represented as levels, such as level 2. Conduits wall off zones, such as conduit 101, into DMZ areas. Distributed firewall devices and other network management devices can be located in conduits for servicing a particular zone. Level 0 can contain low level OT devices, such as device 105, that may not even have organic network capabilities. Level 1 can contain controllers and network interfaces to connect the level 0 devices to a network. Higher level devices can include domain controllers, databases, web servers, email servers, and the like, depending on the specific implementation of an enterprise.

FIG. 2 is a more detailed block diagram illustrating the network device 120 of the system of FIG. 1, according to one embodiment. The network device 110 includes a packet inspector 210, a network level module 220, an IT segment module 230, an OT segment module 240, a hierarchy module 250 and an interface display module 260. The components can be implemented in hardware, software, or a combination of both.

The packet inspector 210 to perform deep packet inspection on network packets to identify a plurality of network devices within the hybrid enterprise network.

The network level module 220 to determine whether each of the plurality of network devices is part of the IT segment or the OT segment by examining a physical network address, a data type and a network protocol of one or more of the network packets, wherein the IT segment has multiple levels and the OT segment has multiple levels.

The IT segment module 230 to layout IT devices within the IT levels of the IT segment. Each IT device connection to a conduit between the IT levels can be identified, based on the examination of network packets.

The OT segment module 240 to layout OT devices within the OT levels of the OT segment. Also, each OT device connection to a conduit between the OT levels can be identified, based on the examination of network packets.

The hierarchy module 250, in one embodiment, dynamically generates a network hierarchy that maps the IT segment with interconnected IT levels having IT devices relative to the OT segment with interconnected OT levels having OT devices. In another embodiment, security zones are set up over the network hierarchy. Each security zone can include just OT devices, just IT devices or a combination of OT and IT devices. Devices can be part of more than one security zone, in some cases. The security zones can have independent network policies for disparate treatment.

The interface display module 260 to output the network hierarchy for display to a user. In one case, the network hierarchy is displayed on its own, for functions separate from security. In another case, the network hierarchy is displayed with an overlay of security zones. A user can manipulate the security zones with a mouse, bringing devices in and out of zones, and dropping policy selections on to zones.

II. Methods for OT/IT Security Zone Layout (FIGS. 3-4)

Figure 3:
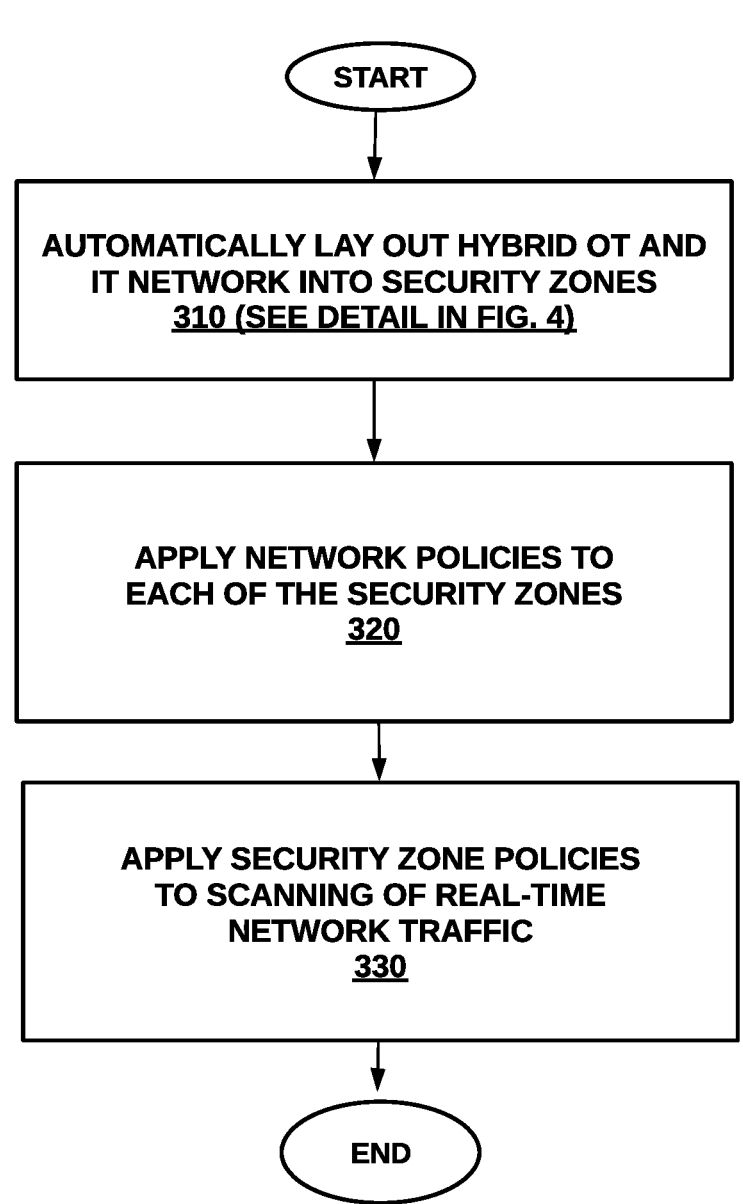
FIG. 3 is a high-level flow diagram illustrating a method for automatically laying out security zone policies for IT and OT devices in a hybrid enterprise network including an IT segment and an OT segment, according to one embodiment.

FIG. 3 is a high-level flow diagram illustrating a method 300 for applying security zone policies based on zones, according to an embodiment.

At step 310, a hybrid network is automatically laid out into security zones, a discussed further below in association with FIG. 4. At step 320, network policies are applied to each of the zones. At step 330, security zone policies are applied to scanning of real-time network traffic.

FIG. 4 is a more detailed flow diagram further illustrating the step 310 for automatically laying out security zone policies for IT and OT devices in a hybrid enterprise network including an IT segment and an OT segment, according to one embodiment. The method 300 can be implemented by, for example, system 100 of FIG. 1.

At step 410, deep packet inspection is performed on network packets to identify a plurality of network devices within the hybrid enterprise network.

At step 420, it is determined whether each of the plurality of network devices is part of the IT segment or the OT segment by examining a physical network address, a data type and a network protocol of one or more of the network packets. The IT segment has multiple levels and the OT segment has multiple levels.

At step 430, IT devices are laid out within the IT levels of the IT segment. Further, each IT device connection to a conduit between the IT levels is identified, based on the examination of network packets.

At step 440, OT devices are laid out within the OT levels of the OT segment. Additionally, each OT device connection to a conduit between the OT levels is identified, based on the examination of network packets.

At step 450, a network hierarchy is dynamically generated that maps the IT segment with interconnected IT levels having IT devices relative to the OT segment with interconnected OT levels having OT devices.

At step 460, a plurality of security zones is set up from the IT layout and the OT layout, wherein each of the plurality of security zones has a corresponding one or more security zone policies.

At step 470, the network hierarchy overlaid with the plurality of security zones is output for display to a user.

III. Computing Device for OT/IT Security Zone Layout (FIG. 5)

Figure 5:
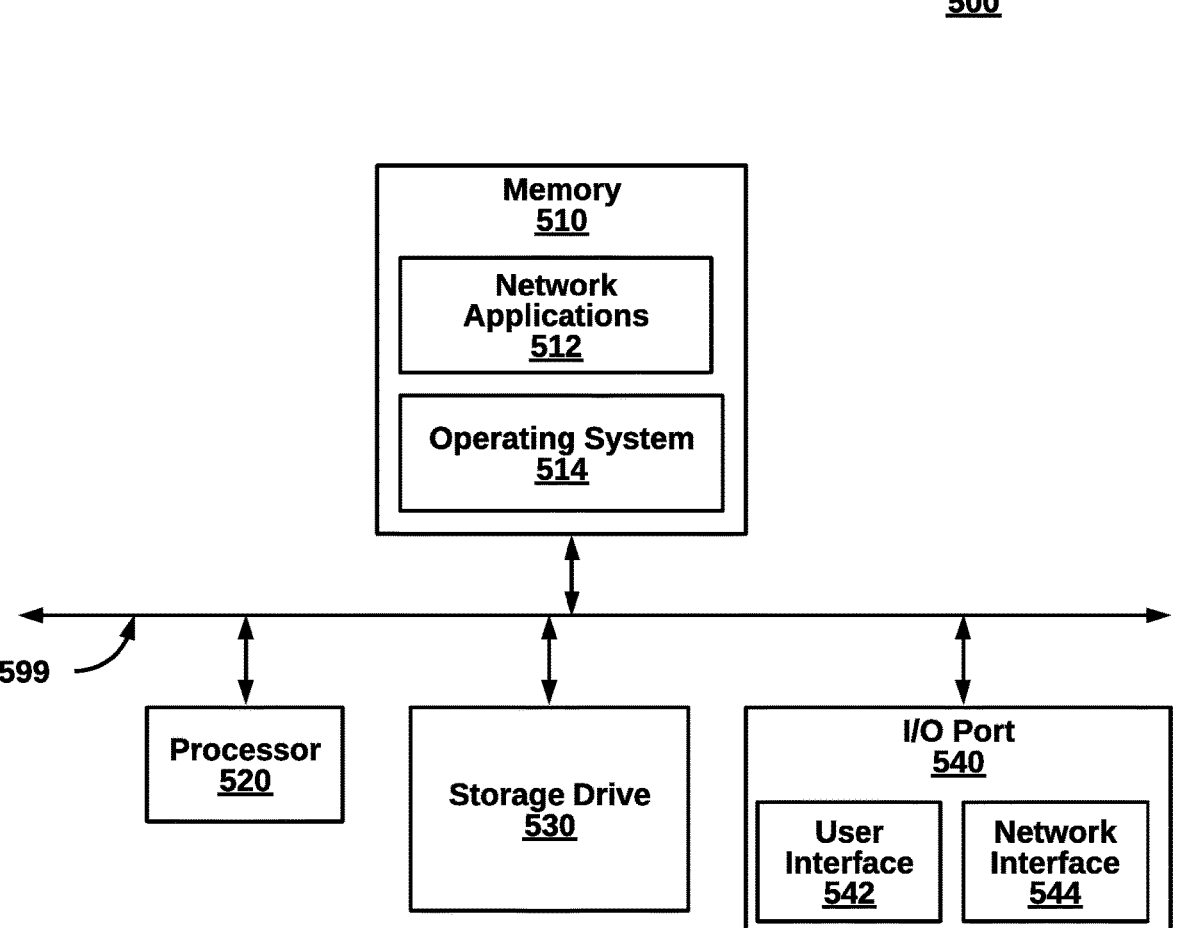
FIG. 5 is a block diagram illustrating an example computing device for the system of FIG. 1, according to one embodiment.

FIG. 5 is a block diagram illustrating a computing device 500 for use in the system 100 of FIG. 1, according to one embodiment. The computing device 600 is a non-limiting example device for implementing each of the components of the system 100, including the network device 110 and the station 120. Additionally, the computing device 600 is merely an example implementation itself, since the system 100 can also be fully or partially implemented with laptop computers, tablet computers, smart cell phones, Internet access applications, and the like.

The computing device 500, of the present embodiment, includes a memory 510, a processor 620, a hard drive 530, and an I/O port 540. Each of the components is coupled for electronic communication via a bus 650. Communication can be digital and/or analog, and use any suitable protocol.

The memory 510 further comprises network access applications 512 and an operating system 514. Network access applications 512 can include a web browser, a mobile access application, an access application that uses networking, a remote access application executing locally, a network protocol access application, a network management access application, a network routing access applications, or the like.

The operating system 514 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7-11), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 520 can be a network processor (e.g., optimized for IEEE 802.11), a general-purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 520 can be disposed on silicon or any other suitable material. The processor 520 can receive and execute instructions and data stored in the memory 610 or the hard drive 530.

The storage device 530 can be any non-volatile type of storage such as a magnetic disc, EEPROM, Flash, or the like. The storage device 630 stores code and data for access applications.

The I/O port 540 further comprises a user interface 642 and a network interface 544. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VOIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

I claim:

1. A computer-implemented method in network segmentation firewall in a hybrid enterprise network, wherein the hybrid enterprise network includes an information technology (IT) segment and an operational technology (OT) segment, for automatically laying out security zone policies for IT and OT devices, the method comprising:
   performing deep packet inspection on network packets to identify a plurality of network devices within the hybrid enterprise network;
   determining whether each of the plurality of network devices is part of the IT segment or the OT segment by examining a physical network address, a data type and a network protocol of one or more of the network packets, wherein the IT segment has multiple levels and the OT segment has multiple levels;
   laying out IT devices within the IT levels of the IT segment, and identifying each IT device connection to a conduit between the IT levels, based on the examination of network packets;
   laying out OT devices within the OT levels of the OT segment, and identifying each OT device connection to a conduit between the OT levels, based on the examination of network packets;
   dynamically generating a network hierarchy that maps the IT segment with interconnected IT levels having IT devices relative to the OT segment with interconnected OT levels having OT devices;
   setting up a plurality of security zones from the IT layout and the OT layout, wherein each of the plurality of security zones has a corresponding one or more security zone policies; and
   outputting the network hierarchy overlaid with the plurality of security zones for display to a user.

2. The method of claim 1, wherein the plurality of security zones comprises a first security zone including one or more of the OT devices and corresponding conduits.

3. The method of claim 1, wherein the plurality of security zones comprises a second security zone including one or more of the IT devices and corresponding conduits.

4. The method of claim 2, wherein the plurality of security zones comprises multiple OT security zones and multiple IT security zones.

5. A non-transitory computer-readable medium in a network segmentation firewall in a hybrid enterprise network, wherein the hybrid enterprise network includes an information technology (IT) segment and an operational technology (OT) segment, for automatically laying out security zone policies for IT and OT devices, the method comprising:
   performing deep packet inspection on network packets to identify a plurality of network devices within the hybrid enterprise network;
   determining whether each of the plurality of network devices is part of the IT segment or the OT segment by examining a physical network address, a data type and a network protocol of one or more of the network packets, wherein the IT segment has multiple levels and the OT segment has multiple levels;
   laying out IT devices within the IT levels of the IT segment, and identifying each IT device connection to a conduit between the IT levels, based on the examination of network packets;
   laying out OT devices within the OT levels of the OT segment, and identifying each OT device connection to a conduit between the OT levels, based on the examination of network packets;
   dynamically generating a network hierarchy that maps the IT segment with interconnected IT levels having IT devices relative to the OT segment with interconnected OT levels having OT devices;
   setting up a plurality of security zones from the IT layout and the OT layout, wherein each of the plurality of security zones has a corresponding one or more security zone policies; and
   outputting the network hierarchy overlaid with the plurality of security zones for display to a user.

6. A network segmentation firewall in a hybrid enterprise network, wherein the hybrid enterprise network includes an information technology (IT) segment and an operational technology (OT) segment, for automatically laying out security zone policies for IT and OT devices, the network segmentation firewall comprising:
   a processor;
   a network interface communicatively coupled to the processor and to the hybrid enterprise network; and
   a memory, communicatively coupled to the processor and storing:
      a packet inspector to perform deep packet inspection on network packets to identify a plurality of network devices within the hybrid enterprise network;
      a network level module to determine whether each of the plurality of network devices is part of the IT segment or the OT segment by examining a physical network address, a data type and a network protocol of one or more of the network packets, wherein the IT segment has multiple levels and the OT segment has multiple levels;
      an IT segment module to layout IT devices within the IT levels of the IT segment, and identify each IT device connection to a conduit between the IT levels, based on the examination of network packets;
      an OT segment module to layout OT devices within the OT levels of the OT segment, and identify each OT device connection to a conduit between the OT levels, based on the examination of network packets;
      a security zone module to dynamically generate a network hierarchy that maps the IT segment with interconnected IT levels having IT devices relative to the OT segment with interconnected OT levels having OT devices, and sets up a plurality of security zones from the IT layout and the OT layout, wherein each of the plurality of security zones has a corresponding one or more security zone policies; and an interface display module to output the network hierarchy overlaid with the plurality of security zones for display to a user.

7. The network segmentation firewall of claim 6, wherein the network hierarchy comprises a Purdue Model.

8. The network segmentation firewall of claim 6, further comprising a cloud segment module to examine packets from a data communication network external to the hybrid enterprise network and position cloud network devices within a cloud segment of the network hierarchy.

9. The network segmentation firewall of claim 6, wherein a new device is detected, and in response, the network hierarchy is updated to include the new device.

10. The network segmentation firewall of claim 6, receiving user input to manually adjust positioning of one or more of the network devices within the display of the network hierarchy.

11. The network segmentation firewall of claim 6, wherein the IT segment module is communicatively coupled to an IT firewall device that is coupled to the network devices of the IT segment.

12. The network segmentation firewall of claim 6, wherein the OT segment module is communicatively coupled to an OT firewall device that is coupled to the network devices of the OT segment.

13. The network segmentation firewall of claim 6, wherein the OT segment module is communicatively coupled to an OT firewall device that is coupled to an ICS firewall device that is coupled to the network devices of an ICS sub segment of the OT segment, wherein one or more of the network devices is positioned within an ICS level of the ICS sub segment.

14. The network segmentation firewall of claim 6, wherein a network device comprises an IT device with integrated network capability.

15. The network segmentation firewall of claim 6, wherein a network device comprises an OT device to control one or more ICS devices.

16. The network segmentation firewall of claim 15, wherein the one or more ICS devices are each retrofitted with network capability and each comprise an electro mechanical device to perform physical tasks per command from the OT device.

* * * * *